United States Patent
Pollack et al.

(10) Patent No.: US 12,363,010 B2
(45) Date of Patent: *Jul. 15, 2025

(54) PER-PACKET TYPE PACKET LOSS MANAGEMENT

(71) Applicant: Apple Inc., Cupertino, CA (US)

(72) Inventors: Daniel B. Pollack, San Jose, CA (US); Qian Sun, Cupertino, CA (US); Karthick Santhanam, San Jose, CA (US); Christopher M. Garrido, Santa Clara, CA (US); Bradley F. Patterson, Morgan Hill, CA (US); Kevin Arthur Robertson, Sunnyvale, CA (US); Hsien-Po Shiang, Mountain View, CA (US); Erik Vladimir Ortega Gonzalez, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,128

(22) Filed: Sep. 15, 2023

(65) Prior Publication Data

US 2024/0007365 A1  Jan. 4, 2024

Related U.S. Application Data

(63) Continuation of application No. 16/996,796, filed on Aug. 18, 2020, now Pat. No. 11,824,737.

(60) Provisional application No. 62/906,006, filed on Sep. 25, 2019, provisional application No. 62/897,987, filed on Sep. 9, 2019.

(51) Int. Cl.
*G06F 15/16* (2006.01)
*G06F 9/54* (2006.01)
(Continued)

(52) U.S. Cl.
CPC ........ *H04L 41/509* (2013.01); *H04L 41/5003* (2013.01); *H04L 43/0829* (2013.01)

(58) Field of Classification Search
CPC ............... H04L 41/509; H04L 41/5003; H04L 43/0829; H04L 12/24; H04L 12/26
(Continued)

(56) References Cited

U.S. PATENT DOCUMENTS

| 6,628,610 B1 | 9/2003 | Waclawsky et al. |
| 7,477,601 B1 | 1/2009 | Waclawsky |

(Continued)

FOREIGN PATENT DOCUMENTS

| CN | 101267573 A | 9/2008 |
| CN | 101529901 A | 9/2009 |
| CN | 101662455 A | 3/2010 |

OTHER PUBLICATIONS

Chinese Office Action from Chinese Patent Application No. 202010864987.7, dated Feb. 16, 2023, 26 pages including English language summary.

*Primary Examiner* — Hamza N Algibhah
(74) *Attorney, Agent, or Firm* — BAKERHOSTETLER

(57) ABSTRACT

A device implementing a system for packet loss management may include a memory and at least one processor configured to identify a plurality of categories of packets provided for transmission to an electronic device. The at least one processor may be further configured to determine a respective packet loss value for a respective category of the plurality of categories of packets. The at least one processor may be further configured to identify a particular category of the plurality of categories of packets for which the determined respective packet loss value satisfies a packet loss condition. The at least one processor may be further configured to adjust subsequent transmission of packets in the particular category of packets based at least in part on the packet loss condition being satisfied by the determined respective packet loss value for the particular category of packets.

20 Claims, 5 Drawing Sheets

(51) Int. Cl.
  *H04L 29/06* (2006.01)
  *H04L 41/50* (2022.01)
  *H04L 41/5003* (2022.01)
  *H04L 43/0829* (2022.01)
(58) Field of Classification Search
  USPC .......................................................... 370/252
  See application file for complete search history.

(56) References Cited

U.S. PATENT DOCUMENTS

| | | |
|---|---|---|
| 8,935,580 B2 | 1/2015 | Bims |
| 2002/0136219 A1* | 9/2002 | Ding .................. H04N 21/2365 |
| | | 375/E7.277 |
| 2002/0143939 A1 | 10/2002 | Riddle |
| 2003/0007453 A1 | 1/2003 | Ogier |
| 2008/0115185 A1 | 5/2008 | Qiu et al. |
| 2008/0140854 A1 | 6/2008 | Shin et al. |
| 2011/0154427 A1 | 6/2011 | Wei |
| 2012/0092991 A1* | 4/2012 | Jeong ...................... H04L 65/80 |
| | | 370/235 |
| 2012/0278677 A1 | 11/2012 | Kure |
| 2012/0327778 A1 | 12/2012 | Stanwood |
| 2013/0028088 A1 | 1/2013 | Do |
| 2014/0247722 A1 | 9/2014 | Furbeck |
| 2017/0230310 A1* | 8/2017 | Takeuchi .............. H04L 1/0067 |
| 2019/0166057 A1* | 5/2019 | Gilson .................... H04L 65/75 |
| 2019/0200368 A1* | 6/2019 | Omnes ................ H04W 72/087 |
| 2019/0364465 A1* | 11/2019 | Frankkila ........ H04W 36/00837 |
| 2021/0114616 A1* | 4/2021 | Altman ................. H04W 8/205 |
| 2021/0258363 A1* | 8/2021 | Ragot ..................... H04L 69/24 |

\* cited by examiner

PER-PACKET TYPE PACKET LOSS MANAGEMENT

CROSS REFERENCE TO RELATED APPLICATIONS

This application is a continuation of U.S. patent application Ser. No. 16/996,796, entitled "Per-Packet Type Packet Loss Management," filed on Aug. 18, 2020, which claims the benefit of priority to U.S. Provisional Patent Application No. 62/906,006, entitled "Per-Packet Type Packet Loss Management," filed on Sep. 25, 2019, and claims the benefit of U.S. Provisional Patent Application No. 62/897,987, entitled "Multi-Path Connection Management, filed on Sep. 9, 2019, the disclosure of each of which is hereby incorporated herein in its entirety.

TECHNICAL FIELD

The present description relates generally to packet loss management, including managing packet loss on a per-packet type basis.

BACKGROUND

A user of an electronic device may stream audio and/or video to and/or from their electronic device. For example, the user may stream audio and/or video content from a server and/or the user may participate in a communication session, such as an audio and/or video conference session, with one or more other participants using their respective devices. Packet loss experienced by the user's electronic device while streaming audio and/or video may result in a degradation in the quality of the presented audio and/or video streams.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system performs packet loss management on a per-packet type basis, e.g., as opposed to performing packet loss management on a per-connection basis. For example, the subject system may group packets being transmitted, and/or provided for transmission, to another device into different categories of packets. The categories may be determined based on one or more characteristics that groups of the transmitted packets have in common, such as packet size, packet content type (e.g., audio packets, video packets, etc.), a corresponding quality of service, one or more packet flags, and the like. The subject system may then measure and/or determine a separate packet loss value, such as packet loss rate, for each category of packets being transmitted.

When the packet loss value for a particular category of packets satisfies a packet loss condition, such as a packet loss threshold, the subject system may adaptively modify transmission of subsequent packets in the category, such as to reduce and/or mitigate the packet loss. In one or more implementations, the subject system may modify a characteristic of the packets of a category of packets for which the corresponding packet loss value satisfies the packet loss condition, such as to conform with a characteristic of another category of packets that does not satisfy the packet loss condition. For example, if a category of packets having a first packet size are experiencing greater packet loss than a category of packets having a second packet size, the subject system may change the first packet size, such as to be similar to, and/or the same as, the second packet size. In this manner, the subject system provides discrete control over packet loss management across different types of packets being transmitted across a connection.

Figure 1:
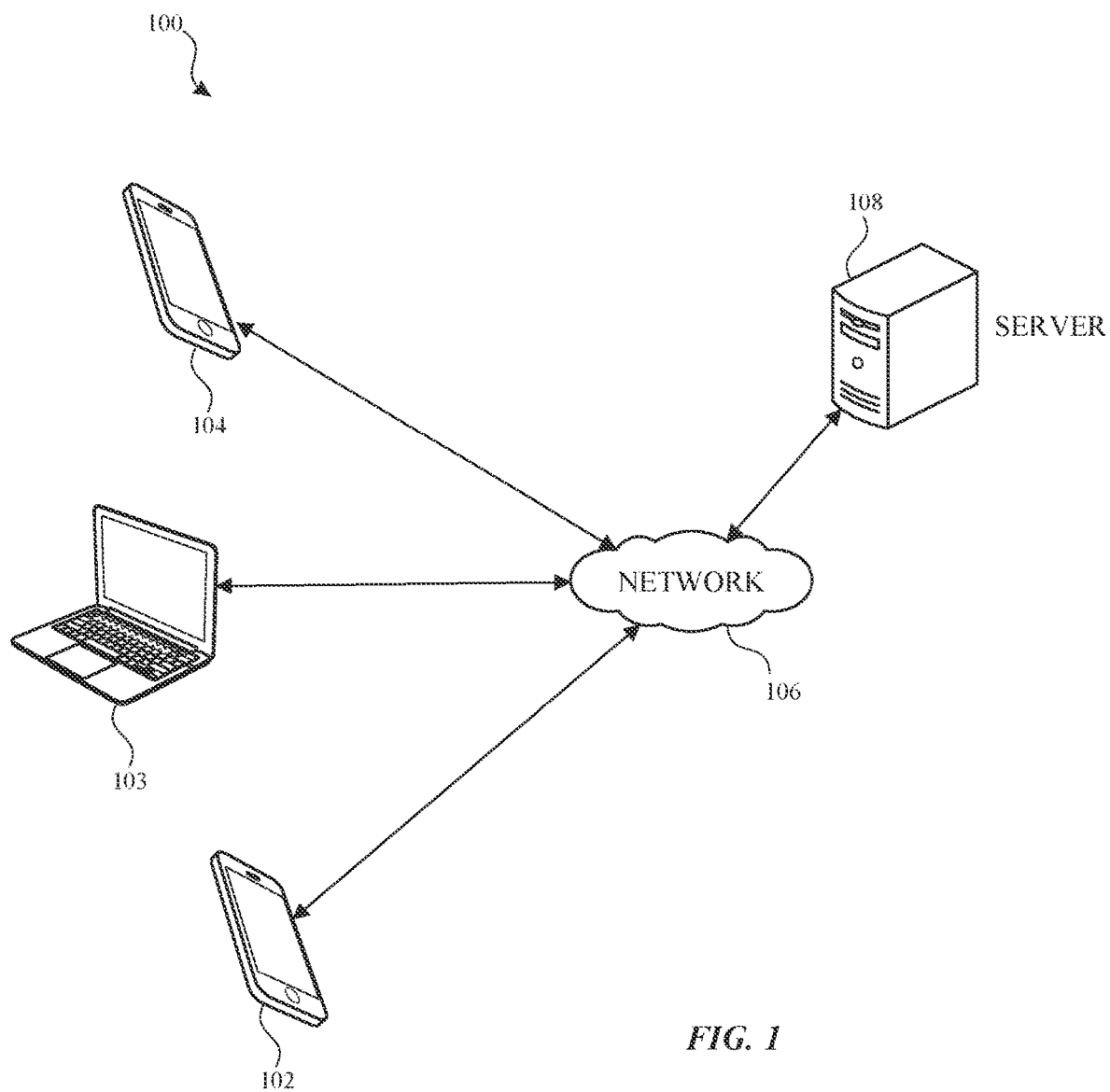
FIG. 1 illustrates an example network environment for implementing per-packet type packet loss management in accordance with one or more implementations.

FIG. 1 illustrates an example network environment 100 for implementing per-packet type packet loss management in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, and 104, a network 106 and a server 108. The network 106 may communicatively (directly or indirectly) couple, for example, any two or more of the electronic devices 102-104 and/or the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

The server 108 may be, and/or may include all or part of the electronic system discussed below with respect to FIG. 5. The server 108 may include one or more servers, such as a cloud of servers, that may be used to facilitate in audio-video conferencing between the electronic devices 102-104.

For explanatory purposes, a single server 108 is shown and discussed with respect to various operations, such as facilitating audio-video conferencing. However, these and other operations discussed herein may be performed by one or more servers, and each different operation may be performed by the same or different servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN (e.g., WiFi) radios, cellular radios, Bluetooth radios, Zigbee radios, near field communication (NFC) radios, and/or other wireless radios. In FIG. 1, by way of example, the electronic devices 102 and 104 are each depicted as a smartphone and the electronic device 103 is depicted as a laptop computer.

The electronic devices 102-104 may be configured to participate in communication sessions, such as audio-video conferencing sessions, for example, where two or more of the electronic devices 102-104 may participate in a conversation in which video and/or audio content streams (e.g., application data) are transmitted between the participant devices. Each of the electronic devices 102-104 may be, and/or may include all or part of, the device discussed below with respect to FIG. 2, and/or the electronic system discussed below with respect to FIG. 5.

In the subject system, one of the electronic devices 102-104, such as the electronic device 102, may initiate a communication session with another of the electronic devices 103-104 and/or the server 108, such as via a transmission control protocol/Internet protocol (TCP/IP) or user datagram protocol (UDP) connection. The electronic device 102 may then transmit packets for the communication session over the connection. The electronic device 102 may group the packets being transmitted, and/or provided for transmission, over the connection for the communication session into different categories based on characteristics of the packets. For example, a first category of packets may correspond to video packets, and a second category of packets may correspond to audio packets, and the like. The electronic device 102 may then monitor a packet loss value, such as a packet loss rate, a packet error rate, a bit error rate, etc., for each identified category of packets being transmitted, and/or provided for transmission, over the connection.

When the packet loss value for a given category of packets satisfies a packet loss condition, the electronic device 102 may adaptively modify subsequent transmission of packets in the category of packets to alleviate the packet loss. For example, the electronic device 102 may increase redundancy transmitted, and/or provided for transmission, with the packets in the given category of packets, may change a size of the packets in the given category of packets, may utilize a different communication interface and/or connection for transmitting the packets in the given category of packets, and the like. Example processes for performing packet-loss management on a per-packet type basis are discussed further below with respect to FIGS. 3 and 4.

Figure 2:
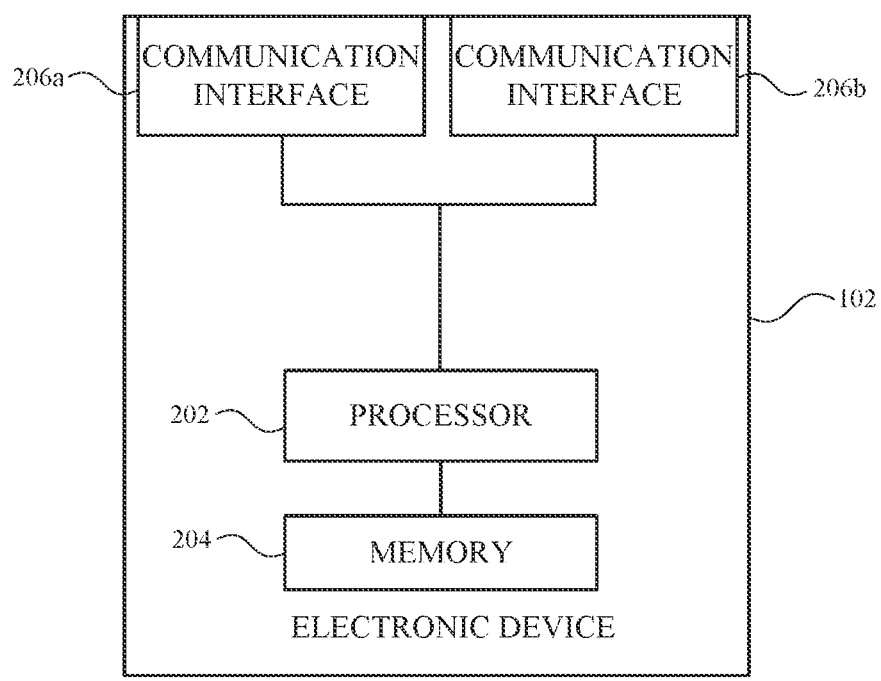
FIG. 2 illustrates an example electronic device that may implement a system for per-packet type packet loss management in accordance with one or more implementations.

FIG. 2 illustrates an example electronic device 102 that may implement a system for per-packet type packet loss management in accordance with one or more implementations. For example, the electronic device 102 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and communication interfaces 206a-206b. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interfaces 206a-206b may include suitable logic, circuitry, and/or code that enables wired or wireless communication, such as between any of the other electronic devices 103-104 and/or the server 108 over the network 106. In one or more implementations, all or part of the same circuitry may be shared by both of the communication interfaces 206a-206b. The communication interfaces 206a-206b may include, for example, one or more of a Bluetooth communication interface, a cellular communication interface (e.g., 3G, 4G, LTE, 5G, etc.), an NFC interface, a Zigbee communication interface, a WLAN communication interface, (WiFi, WiMAX, LiFi, 2.4 GHz, 5 GHz, etc.) communication interface, a USB communication interface, an Ethernet communication interface, a millimeter wave (e.g., 60 GHz) communication interface, or generally any communication interface.

In one or more implementations, when one of the communication interfaces 206a-206b, such as the communication interface 206a, is capable of communicating via different communication protocols, standards, and/or frequencies, such as LTE, 5G, etc., each of the different communication protocols, standards, and/or frequencies may be considered a different link parameter for purposes of establishing available links with another electronic device.

For explanatory purposes, the electronic device 102 is illustrated in FIG. 2 as including two communication interfaces 206a-206b; however, the electronic device 102 may include any number of communication interfaces.

In one or more implementations, one or more of the processor 202, the memory 204, the communication interfaces 206a-206b, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
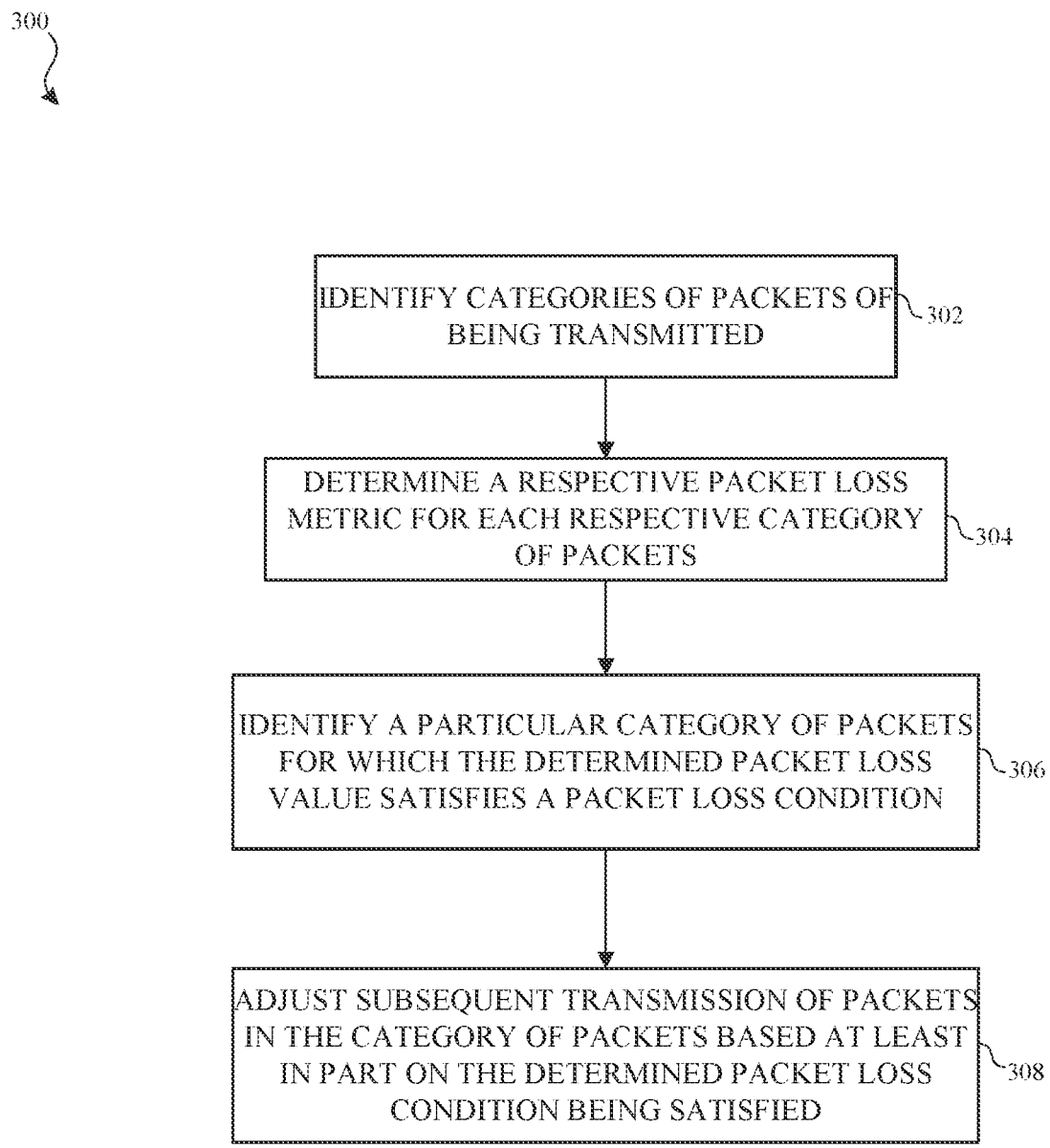
FIG. 3 illustrates a flow diagram of an example process of per-packet type packet loss management in accordance with one or more implementations.

FIG. 3 illustrates a flow diagram of an example process 300 of per-packet type packet loss management in accordance with one or more implementations. For explanatory purposes, the process 300 is primarily described herein with reference to the electronic devices 102, 104 of FIG. 1. However, the process 300 is not limited to the electronic devices 102, 104 of FIG. 1, and one or more blocks (or operations) of the process 300 may be performed by one or more other components of the server 108 and by other suitable devices (e.g., any of the electronic devices 102-104). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 may begin, for example, after a communication session is established between the electronic devices 102, 104, such as using a TCP/IP or UDP connection. The electronic device 102 may transmit different types of packets, such as video packets, audio packets, control packets, and the like, to the electronic device 104 over the connection, and vice-versa. The electronic device 102 may identify categories of packets being transmitted, and/or provided for transmission, over the connection (302).

Each identified category of packets may be associated with one or more particular characteristics. The characteristics may include, for example, packet content type (e.g., video, audio, control, etc.), a size of packets (e.g., less than X bytes, X to Y bytes, greater than Y bytes, etc.), a quality of service associated with packets, a redundancy scheme, one or more packet flags, a communication interface used to transmit the packets (e.g., cellular, Wi-Fi, etc.), a connection type used to transmit the packets (e.g., TCP/IP (v4/v6), UDP, etc.), or generally any characteristic by which packets may be categorized.

In one or more implementations, the electronic device 102 may monitor characteristics of packets being transmitted, and/or provided for transmission, over the connection to identify common characteristics across the packets. The electronic device 102 may then dynamically group the packets into categories based on the characteristics in common. In one or more implementations, the different categories of packets may be at least in part pre-determined. In one or more implementations, the electronic device 102 may dynamically adjust the categories of packets, such as based on different packet characteristics that are monitored as being associated with the same, or similar, packet loss values. In one or more implementations, the electronic device 102 may further segment a particular category of packets into multiple different categories if the packet loss within the category is non-uniformly spread across different types of packets within the category.

The electronic device 102 may determine a respective packet loss value for each respective category of packets (304). The packet loss value may be include one or more of a packet error rate, a bit error rate, a packet loss rate, and the like. In one or more implementations, the electronic device 102 may measure the packet loss value for each respective category of packets, such as based on a received acknowledgment packets and/or retransmission requests.

In one or more implementations, the electronic device 102 may receive the packet loss value for each respective category of packets from the electronic device 104. For example, the electronic device 102 may transmit an indication of the respective characteristics of each category of packets to the electronic device 104. The electronic device 104 may then measure the packet loss value for each category and transmit an indication of the same back to the electronic device 102.

The electronic device 102 may identify a particular category of packets for which the determined packet loss value satisfies a packet loss condition (306). The packet loss condition may be, for example, a packet loss threshold that is satisfied when exceeded. In one or more implementations, each different category of packets may be associated with a different packet loss condition and/or one or more of the categories of packets may be associated with the same packet loss condition.

Upon identifying the particular category of packets for which the determined packet loss value satisfies the packet loss condition (306), the electronic device 102 may adjust the subsequent transmission of packets in the category of packets based at least in part on the determined packet loss condition being satisfied (308). For example, the electronic device 102 may increase redundancy associated with the category of packets, such as forward error correction coding, redundant data transmissions, and the like, without increasing the redundancy associated with other categories of transmitted packets for which the respective packet loss value does not satisfy the packet loss condition.

In one or more implementations, the electronic device 102 may determine one or more characteristics of one or more categories of packets for which the respective packet loss values do not satisfy the packet loss condition, and the electronic device 102 may modify subsequent transmission of the packets in the determined category based on the one or more characteristics of the one or more categories of packets for which the respective packet loss values do not satisfy the packet loss condition.

For example, if a first category of packets associated with a first packet size are experiencing packet loss that satisfies the packet loss condition, and a second category of packets characterized by a second packet size are not experiencing packet loss that satisfies the packet loss condition, the electronic device 102 may re-size subsequent packets in the first category of packets to be similar to, and/or the same as, the second packet size.

In one or more implementations, if a first category of packets associated with a first amount of redundancy (e.g., a first redundancy scheme) are experiencing packet loss that satisfies the packet loss condition, and a second category of packets characterized by a second amount of redundancy (e.g., a second redundancy scheme) are not experiencing packet loss that satisfies the packet loss condition, the electronic device 102 may reduce the amount of redundancy associated with the second category of packets and may increase the amount of redundancy associated with the first category of packets, such as to satisfy a particular bit rate and/or transmission rate constraint. The amount by which the redundancy for the first category of packets is increased may be based in part on the amount by which the redundancy for the second category of packets is decreased. In one or more implementations, the subsequent transmission of the first category of packets is adjusted substantially inversely proportional to the subsequent transmission of the second category of packets.

Figure 4:
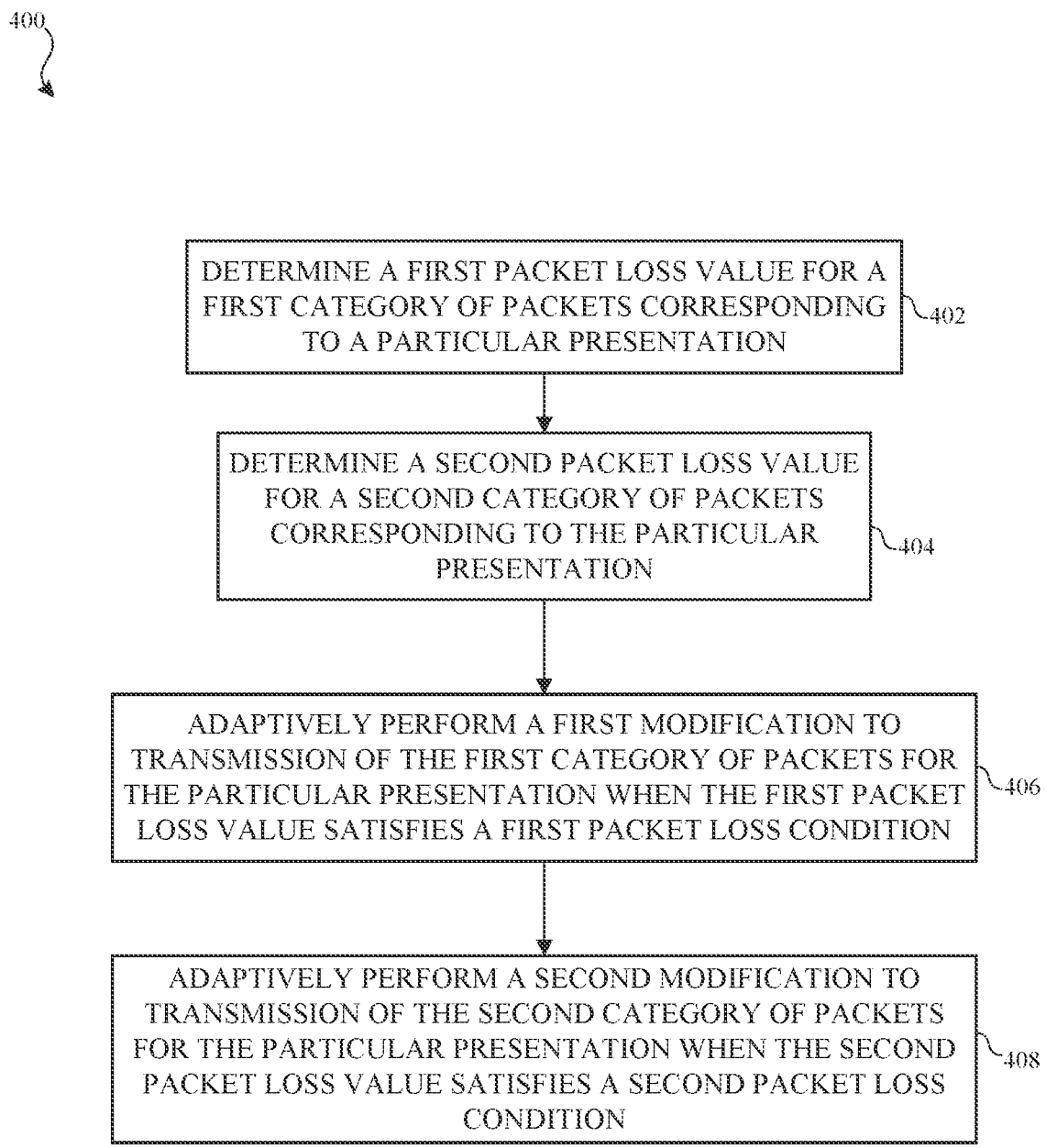
FIG. 4 illustrates a flow diagram of an example process of per-packet type packet loss management for a particular presentation in accordance with one or more implementations.

FIG. 4 illustrates a flow diagram of an example process 400 of per-packet type packet loss management for a particular presentation in accordance with one or more implementations. For explanatory purposes, the process 400 is primarily described herein with reference to the electronic devices 102, 104 of FIG. 1. However, the process 400 is not limited to the electronic devices 102, 104 of FIG. 1, and one or more blocks (or operations) of the process 400 may be performed by one or more other components of the server 108 and by other suitable devices (e.g., any of the electronic devices 102-104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 determines a first packet loss value for a first category of packets corresponding to a particular presentation being transmitted, and/or provided for transmission, to the electronic device 104 (402). The particular presentation may include, for example, audio and video streams being transmitted, and/or provided for transmission, from the electronic device 102 to the electronic device 104, such as for a videoconference. In one or more implementations, the first packet loss value may be measured at the electronic device 104 and transmitted, and/or provided for transmission, to the electronic device 102, and/or the first packet loss value may be determined locally at the electronic device 102. The first category of packets may be characterized by at least one first characteristic. The first packet loss value may be, for example, a packet loss rate, a packet error rate, a bit error rate, or generally any metric that may be indicative of packet loss.

The electronic device 102 may also measure a second packet loss value for a second category of packets corresponding to the particular presentation being transmitted, and/or provided for transmission, to the electronic device 104 (404). In one or more implementations, the second category of packets may be characterized by at least one second characteristic that may differ from the at least one first characteristic. For example, one of the first or second category of packets may correspond to a video stream being transmitted, and/or provided for transmission, for a video conference and the other of the first or second category of packets may correspond to an audio stream being transmitted for the video conference.

The electronic device 102 may adaptively perform a first modification to transmission of the first category of packets for the particular presentation when the first packet loss value satisfies a first packet loss condition (406). The first packet loss condition may be satisfied, for example, when the first packet loss value exceeds a pre-determined packet loss threshold. For example, if the category of packets includes video packets of a particular size, the electronic device 102 may modify the transmission of the first category of packets by adjusting the size of the subsequently transmitted video packets.

The electronic device 102 may adaptively perform a second modification to transmission of the second category of packets for the particular presentation when the second packet loss value satisfies a second packet loss condition (408). In one or more implementations, the second packet loss condition may differ from the first packet loss condition. For example, if the second category of packets includes audio packets, the electronic device 102 may increase the redundancy associated with transmission of the audio packets.

In one or more implementations, if the second packet loss value exceeds the first packet loss value, the electronic device 102 may reduce redundancy associated with the first category of packets and may increase redundancy associated with the second category of packets, such as to satisfy a bit rate and/or transmission rate constraint. The electronic device 102 may continuously monitor and adaptively modify the amount of redundancy transmitted, and/or provided for transmission, for each category of packets, such as based on the packet loss values measured for each category of packets.

In one or more implementations, if the second packet loss value exceeds the first packet loss value, the electronic device may conform at least one characteristic of the second category of packets to the characteristics of the first category of packets. For example, if the second category of packets are large packets and the first category of packets are small packets, the electronic device 102 may reduce the size of the second category of packets, such as to be similar to, and/or the same as, the size of the second category of packets.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 5:
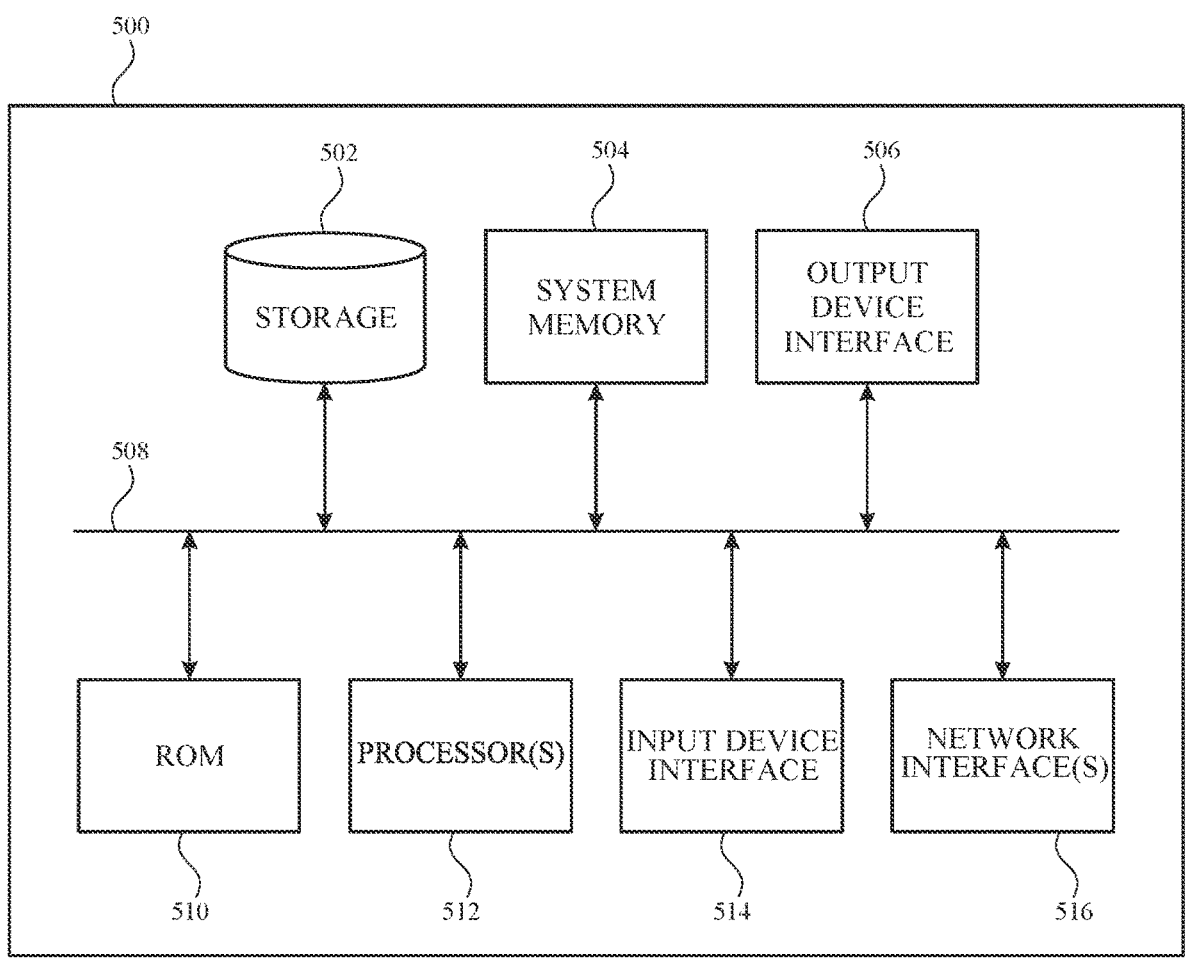
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, one or more of the electronic devices 102-104, and/or one or the server 108 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the server 108 shown in FIG. 1, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   a memory; and
   at least one processor configured to:
      determine a respective link parameter for packets of a respective category of a plurality of categories of packets;
      identify a particular category of the plurality of categories of packets for which the determined respective link parameter satisfies a condition; and
      adjust subsequent processing of packets in the particular category of packets based at least in part on the condition of the particular category being satisfied by the determined respective link parameter for the particular category of packets, the adjust comprising:
         identifying another particular category of the plurality of categories of packets for which the determined link parameter does not satisfy the condition;
         decreasing an amount of redundancy associated with the other particular category; and
         increasing another amount of redundancy associated with the particular category, the increased other amount of redundancy being based at least in part on the decreased amount of redundancy.

2. The device of claim 1, wherein the respective category of the plurality of categories of packets is characterized by a respective characteristic.

3. The device of claim 2, wherein the respective characteristic for at least one respective category of the plurality of categories comprises at least one of: a packet size, a packet content type, a quality of service, a packet flag, or a packet redundancy scheme.

4. The device of claim 1, wherein the particular category of packets corresponds to video packets, and the other particular category of packets corresponds to audio packets.

5. The device of claim 1, wherein the at least one processor is further configured to:
   dynamically determine common characteristics across the packets and
   group the packets into the plurality of categories based at least in part on the dynamically determined common characteristics across the packets.

6. The device of claim 1, wherein the at least one processor is further configured to:
   provide the packets for transmission to an electronic device over a single connection.

7. A method comprising:
   determining a first link parameter for a first category of packets the first category of packets being characterized by at least one first characteristic;
   determining a second link parameter for a second category of packets, the second category of packets being characterized by at least one second characteristic, the first and second category of packets corresponding to a particular presentation;
   adaptively performing a first modification to the first category of packets when the first link parameter satisfies a first condition;
   adaptively performing a second modification to the second category of packets when the second link parameter satisfies a second condition that differs from the first condition; and
   adaptively performing the second modification to the second category of packets and a third modification to the first category of packets when the first link parameter does not satisfy the first condition and the second link parameter satisfies the second condition.

8. The method of claim 7, wherein the at least one first characteristic of the first category of packets comprises a video packet type having a particular size and performing the first modification to the first category of packets comprises adjusting the particular size of the first category of packets.

9. The method of claim 7, further comprising:
   when the first link parameter does not satisfy the first condition and the second link parameter satisfies the second condition:
      decreasing a first amount of redundancy provided for transmission with the first category of packets; and
      increasing a second amount of redundancy provided for transmission with the second category of packets.

10. The method of claim 7, wherein the third modification corresponds to the second modification.

11. The method of claim 7, wherein the at least one first characteristic comprises at least one of a packet size, a packet type, or a quality of service.

12. The method of claim 7, wherein the first modification differs from the second modification.

13. The method of claim 7, further comprising:
    determining common characteristics across packets, the common characteristics comprising the at least one first characteristic and the at least one second characteristic; and
    grouping the packets into the first and second categories of packets based at least in part on the determined common characteristics across the packets.

14. The method of claim 7, wherein the particular presentation comprises an audio-video presentation, the first category of packets comprises audio packets, and the second category of packets comprises video packets.

15. A non-transitory machine-readable medium comprising instructions that, when executed by one or more processors, cause the one or more processors to perform operations comprising:
    determining a first link parameter for a first category of packets the first category of packets being characterized by at least one first characteristic;
    determining a second link parameter for a second category of packets, the second category of packets being characterized by at least one second characteristic, the first and second category of packets corresponding to a particular presentation;

adaptively performing a first modification to the first category of packets when the first link parameter satisfies a first condition;

adaptively performing a second modification to the second category of packets when the second link parameter satisfies a second condition that differs from the first condition; and adaptively performing the second modification to the second category of packets and a third modification to the first category of packets when the first link parameter does not satisfy the first condition and the second link parameter satisfies the second condition.

16. The non-transitory machine-readable medium of claim 15, wherein the at least one first characteristic of the first category of packets comprises a video packet type having a particular size and performing the first modification to the first category of packets comprises adjusting the particular size of the first category of packets.

17. The non-transitory machine-readable medium of claim 15, wherein the operations further comprise:
when the first link parameter does not satisfy the first condition and the second link parameter satisfies the second condition:
decreasing a first amount of redundancy provided for transmission with the first category of packets; and
increasing a second amount of redundancy provided for transmission with the second category of packets.

18. The non-transitory machine-readable medium of claim 15, wherein the third modification correlates to the second modification.

19. The non-transitory machine-readable medium of claim 15, wherein the at least one first characteristic comprises at least one of a packet size, a packet type, or a quality of service.

20. The non-transitory machine-readable medium of claim 15, wherein the particular presentation comprises an audio-video presentation, the first category of packets comprises audio packets, and the second category of packets comprises video packets.

* * * * *